United States Patent [19]

Tsuji

[11] Patent Number: 4,594,732
[45] Date of Patent: Jun. 10, 1986

[54] LETTER PITCH DETECTION SYSTEM
[75] Inventor: Yoshitake Tsuji, Tokyo, Japan
[73] Assignee: NEC Corporation, Tokyo, Japan
[21] Appl. No.: 585,130
[22] Filed: Mar. 1, 1984
[30] Foreign Application Priority Data Mar. 1, 1983 [JP] Japan .................................. 58-33068
Mar. 1, 1983 [JP] Japan .................................. 58-33076

[51] Int. Cl.$^4$ ............................................. G06K 9/46
[52] U.S. Cl. ......................................... 382/9; 382/18
[58] Field of Search ................................. 382/9, 48, 18

[56] References Cited
U.S. PATENT DOCUMENTS 4,408,342 9/1983 Grabowski et al. ................... 382/48
4,461,027 9/1984 Ikeda et al. .............................. 382/9

Primary Examiner—Leo H. Boudreau
Assistant Examiner—Jacqueline Todd
Attorney, Agent, or Firm—Schwartz, Jeffery, Schwaab, Mack, Blumenthal & Evans

[57] ABSTRACT

A method and apparatus for determining the pitch of a character of an aligned group of character images on the surface of a paper where the group contains several characters which touch or merge with each other. Blocks of separable letters are extracted from the aligned group of characters and the size and location of each is detected and stored. Based upon this information a permissible range for a one-letter block width is ascertained and the most frequently occurring letter block width in that permissible range is determined. Based on the most frequently occurring letter block width, an effective range or interval for determining letter pitch is ascertained and numerical method are employed to estimate the letter pitch.

14 Claims, 6 Drawing Figures

LETTER PITCH DETECTION SYSTEM

BACKGROUND OF THE INVENTION

The present invention relates to a letter pitch detection system which automatically detects the pitch of a letter for individually segmenting aligned letter images on a paper surface.

In order to recognize a series of letters in an optical character recognizing (OCR) system, it is necessary to separate the letters from each other. Information necessary for separating the letters from each other includes the letter pitch. The letter pitch may be known in advance if the size or kind of printed matter being read by the OCR system is known. However, the types of documents handled by OCRs has widened in recent years to include a range of postal matter and documents of indefinite letter pitch so that it is often impossible to know the letter pitch in advance. This makes it necessary to estimate the letter pitch from the aligned letter images on the paper surface.

In estimating letter pitch according to the prior art, information is extracted from the paper surface regarding the width of one letter image, for example, the mean pitch between letters. When, however, the widths of each of the letters differ according to the font or category of the letters, as with English printed letters, when the letters are being separated, an error is generated depending on the difference between the mean letter pitch and the actual letter pitch. Therefore, when aligned letter images containing several letters touching or merging with each other are separated by the use of the mean letter pitch, the number of merged letters thus separated may be misjudged, or they may be separated by inaccurate dividing lines.

SUMMARY OF THE INVENTION

It is, therefore, an object of this invention to provide a letter pitch detection system capable of accurately detecting letter pitch in letter images containing several letters touching or merging with each other.

It is another object of this invention to provide a letter segmenting apparatus capable of effectively segmenting letters in a letter group.

According to the present invention, there is provided a letter pitch detection system comprising means for successively extracting a plurality of letter images (hereinafter called "letter blocks") separable by a white background from a series of aligned letter images, and for detecting the locations and heights of the letter blocks, a table for storing information on the frequency of occurrence of each letter block, a means for calculating a mean height of the letters from a plurality of letter block heights and for setting a permissible range for one letter width, and a letter width detection means for detecting the most frequent letter block width within the permissible range for one letter width, with reference to the frequency of occurrence information in said frequency table. The present invention further comprises an effective interval extraction means for detecting an interval of one letter width (hereinafter called "effective interval") which is effective for estimating a letter pitch Ps, on the basis of the most frequent letter width by reference to the frequency table, and a letter block width extraction means for rescanning the series of letter images to detect a group of letter blocks that is deemed to be a series of one-letter blocks, in terms of the effective interval and the permissible space width set by the effective interval, and to detect the sum of the number of letters (hereinafter called "the number of connected blocks") in the letter group, the width of the letter blocks, and the space width between the letter blocks (hereinafter called "space widths"), and a letter pitch estimation means for calculating the most likely letter pitch on the basis of the sums obtained for each of several different numbers of connected blocks, and the number of sums (hereinafter called "the number of samples").

BRIEF DESCRIPTION OF THE DRAWINGS

The features and advantages of the present invention will be understood from the following detailed description of a preferred embodiment of this invention taken in conjunction with the accompanying drawings, wherein.

DETAILED DESCRIPTION OF THE PRESENTLY PREFERRED EMBODIMENT

Figure 1:
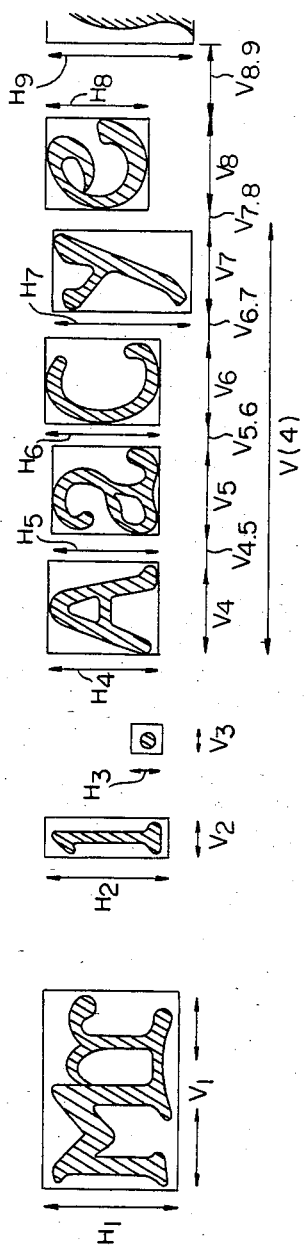
FIG. 1 illustrates an example of aligned letter images to which the present invention may be applied.

FIG. 1 shows an example of a group of aligned letter images to which the present invention may be applied. In FIG. 1, each letter block, i.e., each letter image illustrated as hatched, and which can be separated by a white background, is surrounded by a rectangle. The characters $V_i$ and $H_i$ ($i=1 \ldots 9$), respectively, indicate the width and height of each letter block.

Figure 2:
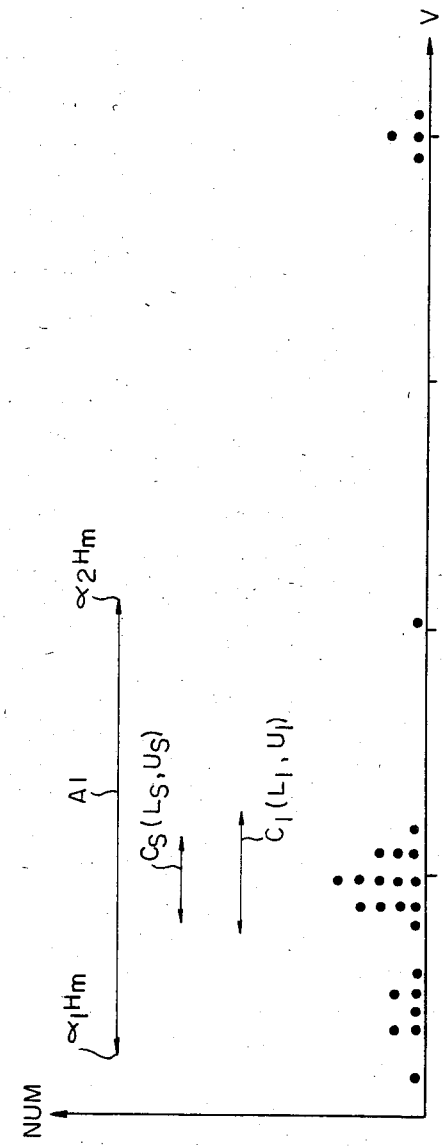
FIG. 2 illustrates the frequency distribution of the letter block widths of FIG. 1.

The principle of the present invention will now be summarized with reference to FIG. 1. The locations, heights and widths of a series of letter blocks are detected, and an effective one-letter width interval, effective for estimating the letter pitch, is determined on the basis of the frequency of occurrence (frequency distribution) of the widths of the series of letter blocks as shown in FIG. 2. For the letter blocks within the effective width interval, a sum $V(k)$ of the letter block widths and the space widths of a number k of connected blocks is determined (e.g., $V(4)$ equals the sum of the block widths $V_4$, $V_5$, $V_6$, and $V_7$ and the spaces widths $V_{4,5}$, $V_{5,6}$, $V_{6,7}$ and $V_{7,8}$ in FIG. 1, for $k=4$). In general, the letter block widths and the space widths of k-connected blocks are determined from the sum of the letter block widths and the space widths of the first to the k letter blocks. If the (k+1) space width, $V_{k+1, k+2}$, (which corresponds to $V_{8,9}$ in FIG. 1), which is determined by the position of the (k+2) letter block and by the position and width of the (k+1) letter block, is larger than a permissible space width, the letter block width may be determined by a method described below.

When a letter block width is obtained which is effective for estimating the pitch of an isolated letter, but which cannot provide a number k (where $k \leq 1$) of connected letter blocks by the above method, e.g., the letter block width $V_8$ in FIG. 1, that letter block width may be detected as the sum $V(1)$ where $k=1$.

In this way, the most appropriate letter pitch Ps is estimated on the basis of the sum $V(k)$ of a number of samples $n(k)$ obtained for different sets of k-connected letter blocks. The value $1/k \cdot V(k)$, is hereinafter referred to as "estimated one-letter width" and the mean value of the sum of the samples $n(k)$ is hereinafter referred to as the sum $V(k)$. The characteristics of the estimated one-letter width $1/k \cdot V(k)$ using the sum $V(k)$ will now be briefly described. Since the sum $V(k)$ considers the space width between adjoining letters, any difference between the estimated one-letter width $1/k \cdot V(k)$ and the letter pitch Ps is reduced as the number of connected blocks and the number of samples $n(k)$ become larger, thereby providing a satisfactory estimate of the letter pitch Ps.

By using this simple method of obtaining an estimated letter pitch Ps, it is possible to obtain, as the estimated value of the letter pitch Ps, an estimated one-letter width $$\frac{1}{MAX(k)} \cdot V(MAX(k))$$

by dividing the sum $V(MAX(k))$ by the value $MAX(k)$ corresponding to the maximum number of connected blocks (k). For a more accurate estimation of the letter pitch Ps, the best linear estimation of the letter pitch Ps can be obtained by calculating the value of:

$$\sum_{i=1}^{l} w(ki, n(ki)) \cdot \frac{V(ki)}{ki}$$

where the sum $V(ki)$ is obtained for different numbers of connected blocks $ki$, where the number of connected blocks is $ki$ (where $i=1 \ldots$) and where $w(ki, n(ki))$ is a coefficient which is determined by the number of connected blocks $k$ and the number of samples $n(k)$, and may be obtained from the following equation:

$$w(ki, n(ki)) = ki \cdot \sqrt{n(ki)} \, / \, \sum_{i=1}^{l} ki \cdot \sqrt{n(ki)} \ .$$

The estimated letter pitch can, of course, be easily calculated by means of conventional devices such as adders, multipliers and dividers. As detailed below, by manipulating the order of operation of the adders, multipliers and dividers, moreover, it is possible to reduce the calculation time and any possible error. It should be appreciated that the coefficient $w(ki, n(ki))$ need not be used, since an estimate expressed by a linear sum may be used instead.

FIG. 2 illustrates the frequency of occurrence distribution of letter block widths on the paper surface of the example shown in FIG. 1. In FIG. 2, the abscissa V represents various letter block widths, and the ordinate NUM indicates the frequency of occurrence of any particular letter block width.

According to the present invention, the letter block width effective for estimating the letter pitch Ps on a frequency of occurrence distribution basis can be determined in the following manner. First a letter block width A1 which will accommodate one letter is determined from the frequency of occurrence distribution shown in FIG. 2. The interval A1 can be determined from the mean height $H_m$ of a plurality of letter block heights $H_1, H_2, \ldots$ of FIG. 1, and from coefficients $\alpha_1$ and $\alpha_2$, where $\alpha_1$ is greater than $\alpha_2$ and, as detailed below, where $\alpha_1$ and $\alpha_2$, respectively, define the lower and upper limits of a range of letter block widths.

The mean height $H_m$ may be calculated on the basis of the mean height of letter blocks occurring within a predetermined interval determined in accordance with predetermined upper and lower height limits.

Next, an interval Cs within the interval A1 which contains a maximum frequency of occurrence $\Delta\tau$ of predetermined permissible letter block width is determined ($\Delta\tau=3$ in FIG. 2). By iteratively revising the upper limit (Us) of the interval Cs in the upward direction, depending upon the letter block width frequency of occurrence distribution, new upper and lower limits ($U_1$ and $L_1$, respectively) of an interval $C_1$ of a letter block width effective for estimating the letter pitch Ps may be determined. The lower limit $L_1$ may remain unchanged from the lower limit Ls of the interval Cs, if according to the letter block width frequency of occurrence distribution, there appears to be an exextremely narrow letter such as "1", a period, or a single letter divided into two, as occurs for example, in European printed characters. When the letter width fluctuates a little, the lower limit Us may be iteratively revised in the downward direction in accordance with the letter block width frequency of occurrence distribution, so that the number of letter block widths included within the effective interval $C_1$ is increased to increase the reliability of the estimate.

Figure 3:
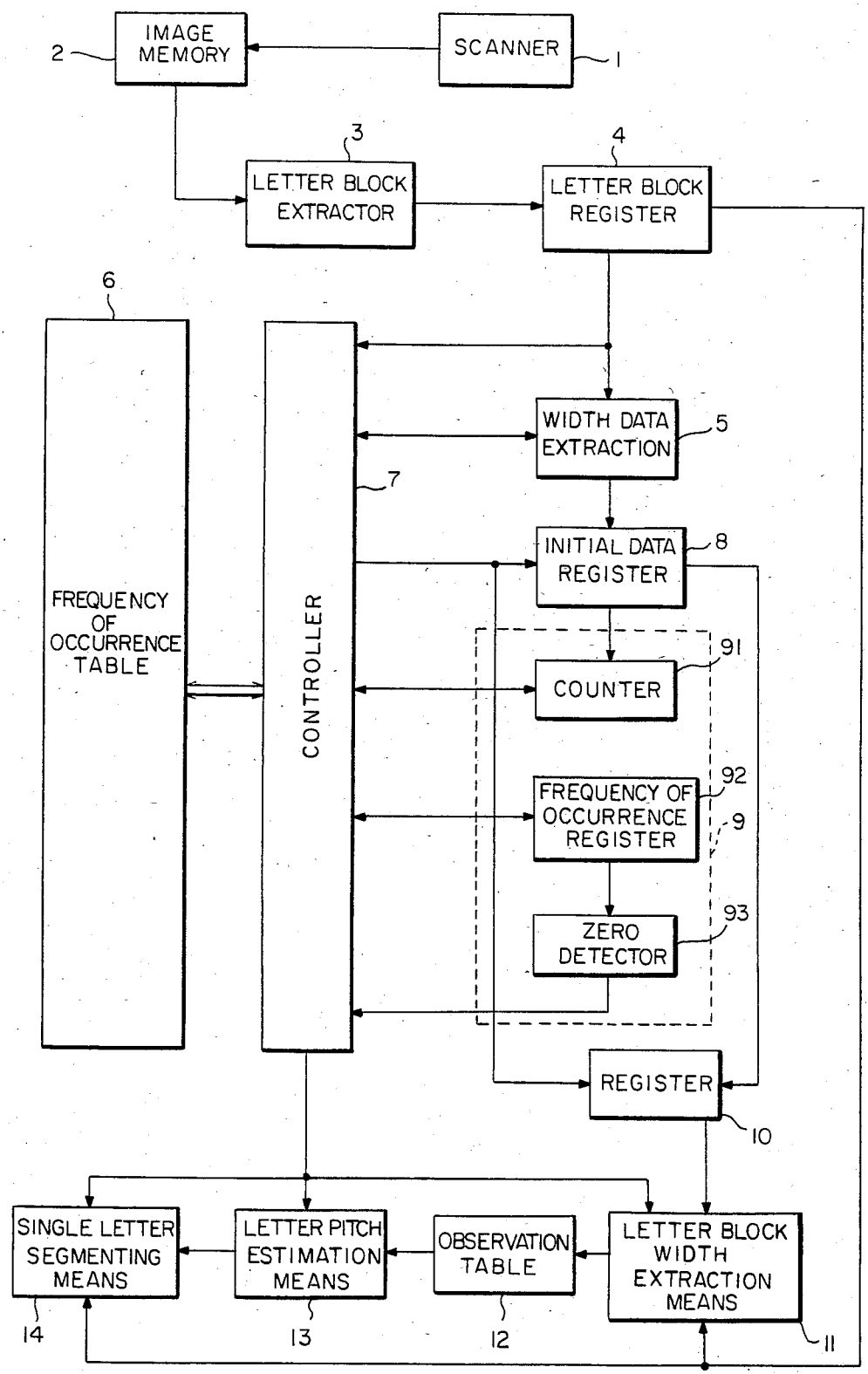
FIG. 3 is a block diagram of a first preferred embodiment of the present invention.

Referring to FIG. 3, a scanner 1 optically scans the aligned letter images on the paper surface to convert the images into electrical signals and quantize the signals into binary signals, which are written into an aligned letter image memory 2. A letter block extractor 3 successively extracts letter blocks from the plurality of aligned letter images stored in the aligned letter image memory 2 and supplies the initial location and size of each letter block to a letter block register 4. As used herein, the size of a letter block is defined by its width V and height H. The letter block extractor 3 may be of the type disclosed in U.S. Pat. No. 4,528,692 entitled "CHARACTER SEGMENTING APPARATUS FOR OPTICAL RECOGNITION" and issued on July 9, 1985, the disclosure of which is hereby incorporated by reference.

The plurality of letter block widths stored in the letter block register 4 are successively supplied to a controller 7. The controller 7 converts the letter block widths into addresses of a frequency of occurrence table 6 having a memory, and then reads out and increments the contents of the frequency of occurrence table 6 and then rewrites the incremented contents into addresses corresponding to the original addresses of the letter block widths in table 6. Thus, the frequency of occurrence of each letter block width V extracted from the aligned letter image memory 2 is stored in an address V in the table 6. As a result, a frequency of occurrence distribution of letter block widths, similar to that illustrated in FIG. 2, is stored in the table 6.

The frequency of occurrence table 6 is first initialized to 0. The controller 7 determines the mean value $H_m$ of the letter block heights stored in the letter block register 4, and sends the value $H_m$ to an initial one-letter width class data extraction means 5. The data extraction means 5 determines the interval Cs (Ls, Us), from the table 6 within the range ($\alpha_1H_m$ to $\alpha_2H_m$) set by the mean letter block width $H_m$, which contains the most frequent value of letter block width within the predetermined permissible width $\Delta\tau$, as shown in FIG. 2. The upper and lower limits Us and Ls are stored as initial data in an initial data register 8.

Figure 4:
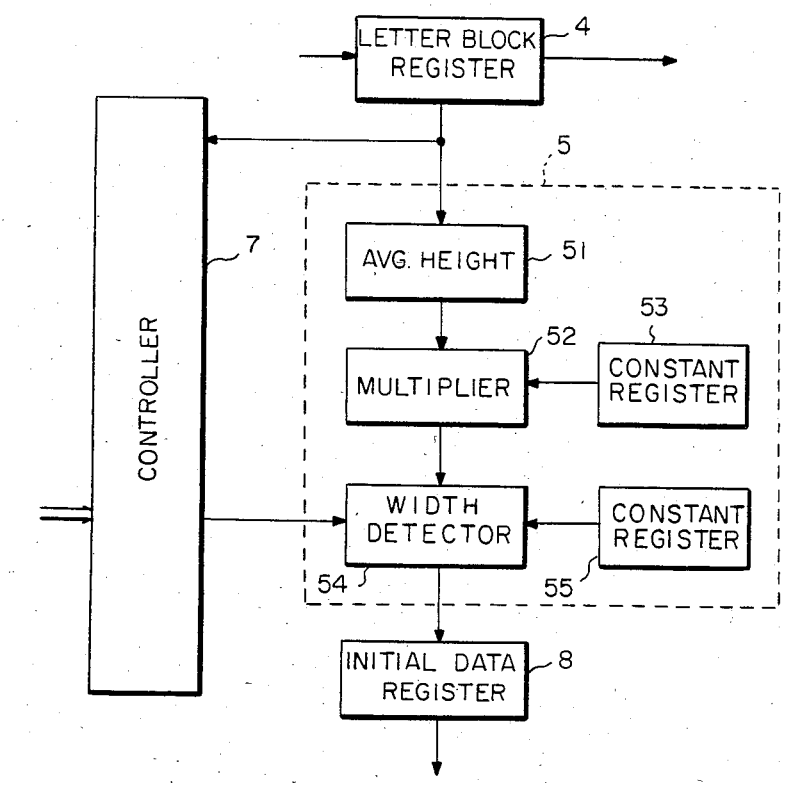
FIG. 4 is a block diagram of the initial one-letter width class data extraction means 5 of the embodiment of FIG. 3.

Referring to FIG. 4, the data extraction means 5 comprises an average height detector 51, a multiplier 52, a constant register 53, a most frequently appearing letter block width detector 54 and a constant register 55.

The height data of the plurality of letter blocks stored in the register 4 is sequentially transferred to an average-height detector 51. The average-height detector 51 calculates an average-value $H_m$ of the heights of the plurality of letter blocks. The detector 51 may, for example, be a circuit for producing an average height corresponding to the most frequently occurring letter height. The average height data $H_m$ is supplied to a multiplier 52 which is also supplied with constants $\alpha_1$ and $\alpha_2$ ($\alpha_1$ being greater than $\alpha_2$) from a constant register 53, and which calculates values of $\alpha_1 H_m$ and $\alpha_2 H_m$. The values $\alpha_1 H_m$ and $\alpha_2 H_m$ are supplied as a possible lower limit and upper limit, respectively, of a letter block width range for one character, to the most frequently appearing letter block width detector 54 which is also supplied with a constant $\Delta\tau$ from a constant register 55.

The detector 54 detects an interval in which the frequency of occurrence values equal or exceed $\Delta\tau$ to determine the lower and upper limit values Ls and Us representative of the most frequently appearing letter block widths within the range $\alpha_1 H_m$ to $\alpha_2 H_m$.

Turning again to FIG. 3, an effective letter block width detection means 9 is provided to detect the interval of letter block width which is effective for detecting the letter pitch Ps. The effective letter block width detection means 9 sets the upper limit Us, stored in the initial data register 8 in a counter 91, and increments it by 1. The number of occurrences of a detected letter block width corresponding to the contents of the counter 91, is read out from the table 6 by the controller 7 and is stored in a frequency of occurrence register 92. A zero detector 93 determines whether or not that frequency of occurrence is zero. When the zero detector 93 determines that the content of the frequency register 92 is zero, the content of the counter 91 becomes the upper limit $U_1$ of the effective letter block width and is set in a register 10. On the other hand, when the zero detector 93 determines that the content of the frequency of occurrence register 92 is not zero, the counter 91 is incremented by 1. These operations are repeated until the zero detector 93 determines the content of the frequency of occurrence register 92 is zero.

Incidentally, it is assumed above that the lower limit $L_s$ stored in the initial data register 8 is not incremented by the controller 7, but is used to set the lower limit $L_1$ of the effective letter block width in the register 10.

As will be understood by one of skill in the art, the effective letter block width detection means 9 could increment the upper value $U_s$ stored in the initial data register 8 and, while referring to the table 6, detect the letter block width at which the frequency of occurrence is a minimum (not necessarily zero) as the upper limit $U_1$ of the effective interval.

A letter block width extraction means 11 detects the sum V(k) of the letter block widths $V_1, V_2 \ldots$ within the effective interval $C_1$ of a number of connected blocks k (where $k \leq 2$) and the space widths $V_{1,2}, V_{2,3}, \ldots$ and $V_{k,k+1}$ and successively stores the sum V(k) for each of a number of samples n(k) extracted for each number of connected blocks k in an observation table 12. A letter pitch estimation means 13 determines the most suitable estimate of the letter pitch Ps on the basis of the sums V(k) for the number of samples n(k), which are extracted for each number of connected blocks k successively stored in the observation table 12.

The letter pitch estimation means 13 may comprise a simple circuit including a maximum detector and a mean value calculator. Specifically, the letter pitch estimation circuit is operable to detect a sum V(MAX(k)) containing the longest number of connected letter blocks MAX(k) from the observation table 12 by means of the maximum detector, and to detect a mean sum $\overline{V}(MAX(k))$ of the sums V(MAX(k)) of the number n(MAX(k)) extracted as an estimate of the letter pitch Ps by means of the mean value calculator.

A one-letter segmenting means 14 separates the text into one-letter units by a known technique, on the basis of both the letter pitch Ps obtained by the letter pitch estimation means 13, and the locations and sizes of the letter blocks stored in the letter block register 4.

Figure 5:
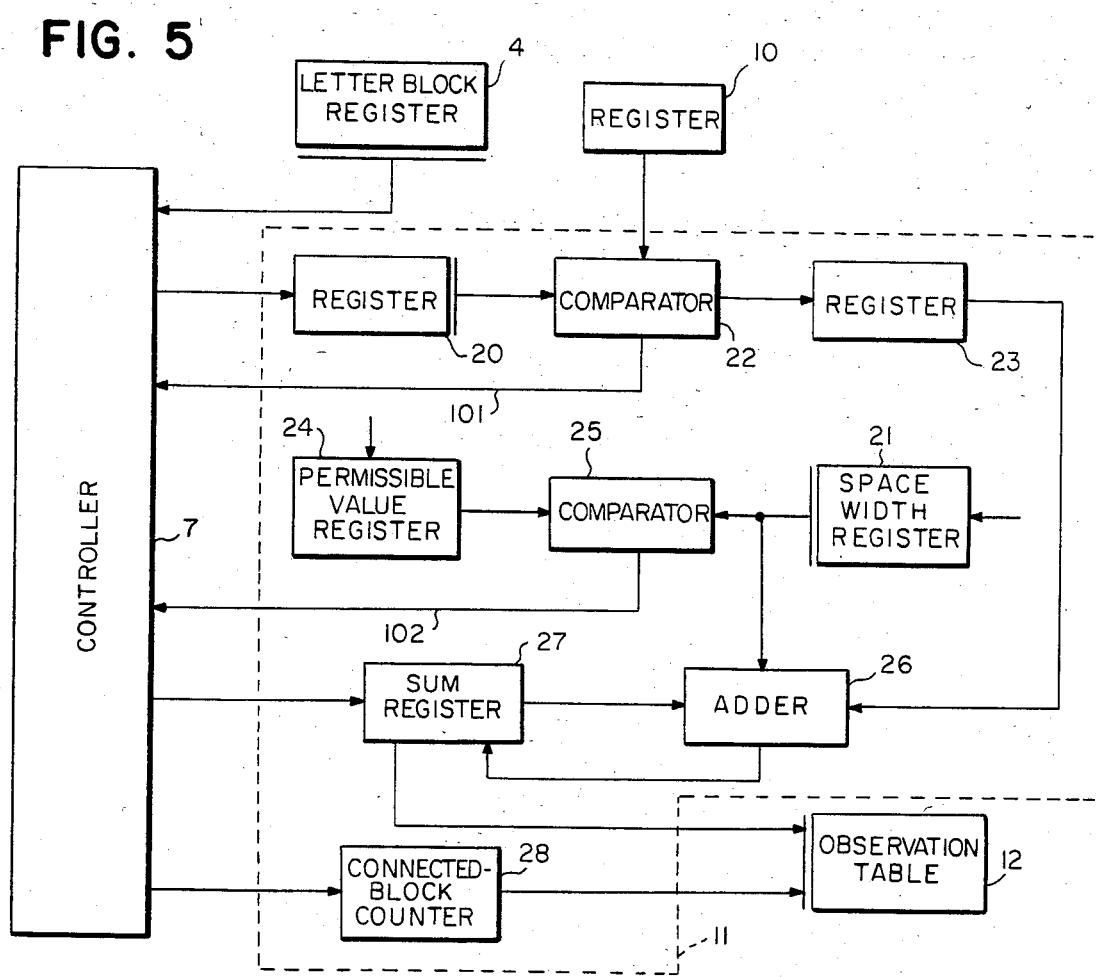
FIG. 5 is a block diagram of the letter block extraction means 11 of the embodiment of FIG. 3.

Referring now to FIG. 5, the controller 7 stores the series of letter block widths $V_1, V_2 \ldots$ from the letter block register 4 in a register 20 in the order in which they were extracted. The space widths $V_{1,2}, V_{2,3} \ldots$ are calculated on the basis of the widths and locations of the series of letter blocks, and are successively stored in a register 21. A comparator 22 examines whether or not a letter block width Vi (where i designates the extraction order) successively transferred by the controller 7, and which is stored in the register 20, lies within the effective interval $C_1$ stored in the register 10. If the letter block width Vi is within to the effective interval $C_1$, a letter block detection signal 101s (the signals on signal lines are designated in the specifications by the suffix "s") is set to "1", and the letter block width Vi is stored in the register 20. Otherwise the letter block detection signal 101s is set to "0". If the letter block detection signal 101s is "1", the controller 7 transfers the corresponding space width $V_{i,i+1}$ stored in a register 21 to a comparator 25.

A predetermined permissible space width is preset in a permissible value register 24 by the controller 7, on the basis of the most frequently occurring value of one-letter width which may be determined from the content of the initial data register 8 set by the initial one-letter width class data extraction means 5 (FIG. 3). The content of the permissible value register 24 is used to determine the occurrence of punctuation for a word, etc., formed by a blank of one or more letters. When the letter block detection signal 101s is "1", the space width $V_{i,i+1}$ stored in the register 21 is sent to the comparator 25 by the controller 7. The comparator 25 compares the content of the permissible value register 24 and the space width $V_{i,i+1}$, and sets a punctuation detection signal 102s to "1" if the space width $V_{i,i+1}$ is less than the content of the permissible value register, or sets the punctuation detection signal 102s to "0" if the space width $V_{i,i+1}$ is greater than the content of the permissible value register.

When the punctuation detection signal 102s is "1", the space width $V_{i,i+1}$ and the letter block width Vi stored in the register 23 are sent to an adder 26 by the controller 7. The adder 26 adds the letter block width Vi, the space width $V_{i,i+1}$, and the content of a sum register 27, and stores the result back in the sum register 27. The sum register 27 is initially set at "0". A connected-block counter 28 is incremented by 1 by the controller 7 when a letter block width within the effective interval $C_1$ is detected as a result of the letter block detection signal 101s becoming "1". The connected-block counter 28 is initially set at "0". The operations thus far described are repeated until either the letter block detection signal 101s or the punctuation detection signal 102s becomes "0".

When the letter block detection signal 101s is "0", it is interpreted as indicating that a letter block width which is not within the effective interval $C_1$ has been detected. The controller 7 stores the contents of the connected-block counter 28 and the sum register 27 is the observation table 12, and resets the content of the counter 28. If the content of the counter 28 is "0", the setting of the observation table 12 is not effected.

If the punctuation detection signal 102s is "0", it is interpreted that a space betwen words has been detected. The controller 7 decrements the connected-block counter 28 by 1, then stores the contents of the connected-block counter 28 and the sum register 27 in the observation table 12 and resets the content of the counter 28.

If the punctuation detection signal 102s is "0" and the connected-block counter 28 is "1", the letter block width Vi from the register 23 and the content of the connected-block counter 28 (which is "1") may also be stored in the observation table 12 by the controller 7.

The operations thus far described are repeated for each letter block width successively stored in the register 20.

Figure 6:
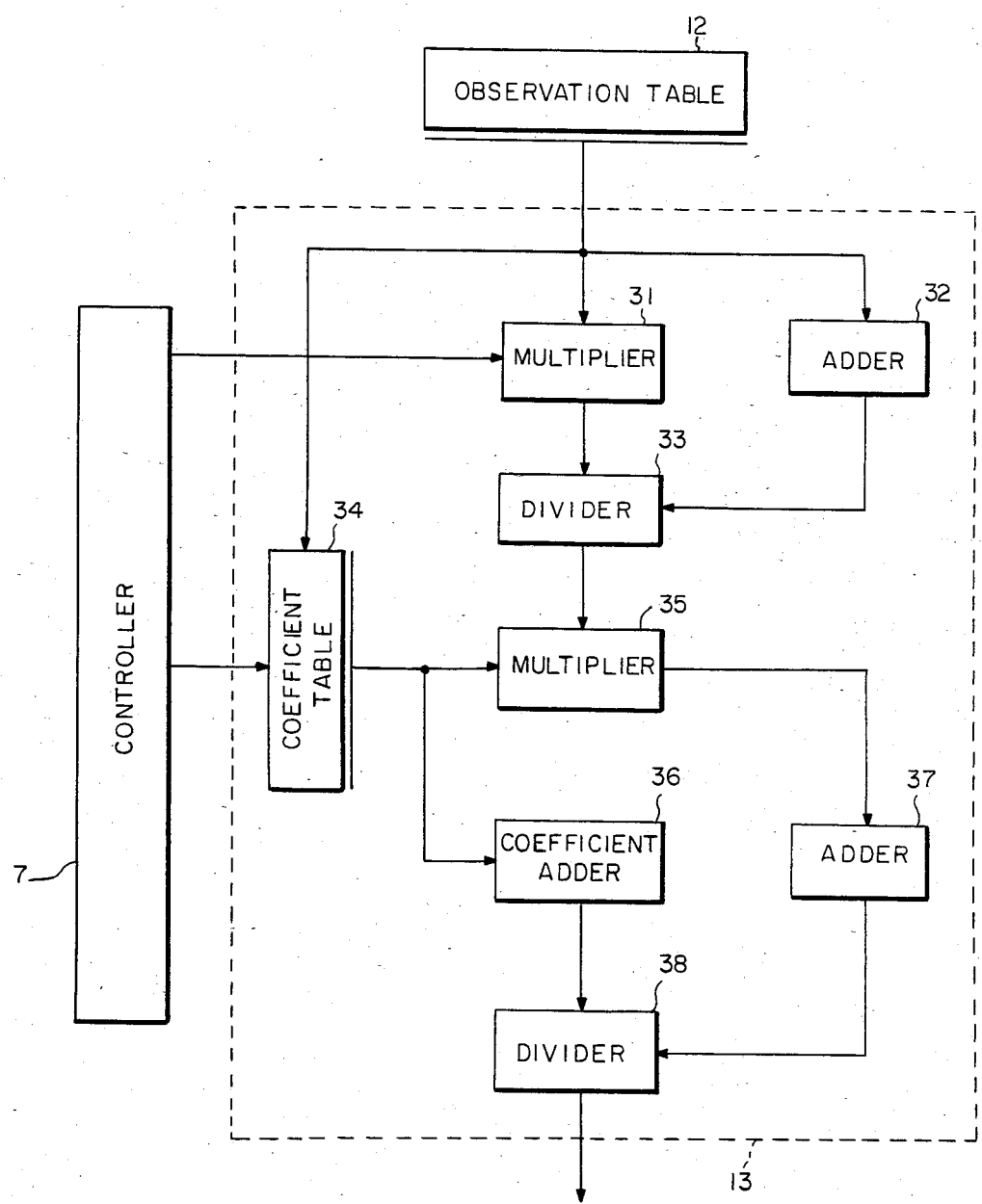
FIG. 6 is a block diagram of the letter pitch estimation means 13 of the embodiment of FIG. 3.

The letter pitch estimation means 13 will be described with reference to FIG. 6. Assume the observation table 12 holds the sums V(ki) of the number of samples n(ki) (hereinafter n(ki) sums V(ki)) for each of l different numbers of connected blocks ki (i=1 ... l) by operation of the letter block width extraction means 11 as described above; and that the number of samples n(ki) is counted and stored in a predetermined area of the observation table 12 by the controller 7 when the sums V(ki) of the number of connected blocks ki are successively set. At first, the number of connected blocks ki and the number of samples n(ki) in the observation table 12 are sent in succession to a multiplier 31. At the same time the n(ki) sums V(ki) in the observation table 12 containing the numbers of connected blocks ki are sent to an adder 32. The multiplier 31 determines the product ki·n(ki) of the number of connected blocks ki and the number of samples n(ki), and transfers the product to a divider 33. The adder 32 adds the n(ki) sums V(ki), and the divider 33 divides the n(ki) sums V(ki) by the product ki·n(ki) and sends the estimated one-letter width $1/ki \cdot \overline{V}(ki)$ (where $\overline{V}(ki)$ is the mean sum of the number of samples n(ki)), obtained for the number of connected blocks ki to a multiplier 35.

Reference numeral 34 indicates a coefficient table in which the coefficients α(ki, n(ki)), determined for each number of connected blocks ki and number of samples n(ki) are stored. For example, the coefficients can be determined to be $ki\sqrt{n(ki)}$ for each number k of connected blocks ki and number of samples n(ki). When the estimated one-letter width $1/ki \cdot V(ki)$ obtained from the number of connected blocks ki and the number of samples n(ki) is sent to the multiplier 35, the coefficient w(ki, n(ki)) may be read out of the coefficient table 34 to the multiplier 35, and simultaneously sent to a coefficient adder 36. The multiplier 35 calculates a product of the coefficient. α(ki, n(ki)) and the estimated one-letter width $1/ki \cdot \overline{V}(ki)$ obtained for each number k of connected blocks ki, and sends the result to an adder 37. The adder 37 calculates the sum $$\sum_{i=1}^{l} \alpha(ki, n(ki)) \cdot \frac{1}{ki} \cdot \overline{V}(ki),$$

which are weighed and obtained from the l numbers of connected blocks ki sent in succession, and sends the calculated sum to a divider 38.

The coefficient adder 36 calculates the sum $$\sum_{i=1}^{l} \alpha(ki, n(ki))$$

of the l coefficients α(ki, n(ki)) sent in succession, and sends the calculated sum to the divider 38. The divider 38 divides the output from the adder 37, i.e., $$\sum_{i=1}^{l} \alpha(ki, n(ki)) \cdot \frac{1}{ki} \cdot \overline{V}(ki),$$

by the output from the coefficient adder 36, i.e., $$\sum_{i=1}^{l} \alpha(ki, n(ki)),$$

so that a linear estimated value of the letter pitch Ps is obtained in the following form:

$$\frac{1}{\sum_{i=1}^{l} \alpha(ki, n(ki))} \cdot \sum_{i=1}^{l} \alpha(ki, n(ki)) \cdot \frac{1}{ki} \cdot \overline{V}(ki)$$

In the letter pitch estimation meanse 13, the number of divisions required to calculate the coefficients w(ki, n(ki)) may be reduced by providing a best linear estimated value $$\sum_{i=1}^{l} w(ki, n(ki)) \cdot \frac{1}{ki} \cdot \overline{V}(ki)$$

as a sum. Since the estimated one-letter width $1/ki \cdot \overline{V}(ki)$ is determined independently of the coefficient w(ki, n(ki)), and since the letter pitch estimation means 13 makes use of the following equation:

$$w(ki, n(ki)) = \alpha(ki, n(ki)) / \sum_{i=1}^{l} \alpha(ki, n(ki))$$

if it is necessary to reduce the number of divisions while still emphasizing processing time and calculation accuracy, substantially the same hardware elements can be used to determine the best linear estimated value by dividing the sum V(ki) by the number of samples n(ki) and the number of connected blocks ki at the end of the calculation instead of initially.

As has been described hereinbefore, according to the present invention the letter pitch can be easily and accurately measured, even when the letter pitch is not known in advance or the text contains letter images in which letters merge with each other or are divided.

I claim:

1. A letter pitch detection system for scanning a series of aligned letter images on a paper surface to extract a letter pitch for separating said series of aligned letter images into one-letter units, said system comprising:

means for successively extracting letter blocks from said series of aligned letter images, and for determining location, width, height and frequency of occurrence information with respect to the width for each of said letter blocks;

effective interval detection means for detecting an interval of one-letter width which is effective for estimating said letter pitch, based on a mean height of said plurality of letter blocks and said frequencies of occurrence of said plurality of letter blocks;

letter block width extraction means for detecting letter blocks which, based on said effective interval and a permissible space width, comprise a plurality of series of one-letter blocks, and for calculating a sum of the number of letters in each of said series of letter blocks, the widths of said letter blocks, and a space width between adjacent letter blocks; and letter pitch estimation means for estimating the letter pitch based on the sum of each of said numbers of letters and the number of said sum.

2. A letter pitch detection system for detecting the pitch of a series of aligned character images on a surface comprising:

a scanner for scanning said aligned character images;

a letter block extractor for successively extracting letter blocks from said series of aligned character images;

means for storing size and location information for each of said letter blocks;

data extraction means for determining, based on said size and location information, a first interval containing most frequently occurring letter block widths;

an effective letter block width detector operable to detect an effective interval for detecting and extracting a letter block based upon said first interval;

a letter block width extraction means for detecting a sum of a number of connected letter blocks having letter block widths within said effective interval; and a letter pitch estimation means for estimating a letter pitch based on said sum and said number of connected letter blocks.

3. The system of claim 2 wherein said scanner is an optical scanner operable to convert the scanned images into electrical signals and wherein said system further comprises an aligned letter image memory for storing said electrical signals.

4. The system of claim 3 wherein said scanner is operable to quantize said electrical signals into binary signals and wherein said letter block extractor extracts said letter blocks from said aligned letter image memory.

5. The system of claim 4 wherein said means for storing comprises a letter block register and said size information comprises a width (V) and a height (H) of a letter block.

6. The system of claim 5 wherein said means for storing further comprises a memory for storing a table comprising the frequency of occurrence of different letter block widths (V).

7. The system of claim 6 wherein said data extraction means is operable to determine said first interval based on a mean value ($H_m$) of letter block heights in said letter block register and said table.

8. The system of claim 2 wherein said data extraction means further comprises an average letter block height detector for calculating a mean height ($H_m$) of the letter blocks in said means for storing and a means for determining upper and lower limits of a maximum interval A1, based on said $H_m$, said maximum interval corresponding to a maximum letter block width range for one character of said series of aligned characters, and means, for determining said first interval within said maximum interval, based on said size and location information.

9. The system of claim 2 wherein said letter block width extraction means also detects space widths between adjacent letter blocks and wherein said sum of letter blocks is V(k) for each of n(k) samples of k connected letter blocks.

10. The system of claim 2 further comprising a register responsive to said effective letter block width detector for storing upper and lower limits of said effective interval.

11. The system of claim 10 further comprising a memory means wherein said extraction means is operable to detect a sum V(k) of k-connected letter blocks within said effective interval, and space widths between adjacent connected letter blocks, and to store the sum V(k) for each of a number n(k) of samples of connected letter blocks in said memory means, and wherein said letter pitch estimating means comprises a detector for detecting a longest number V(MAX(k)) of connected letter blocks in said memory means and a mean value calculator for determining a mean of a number of sums V(MAX(k)).

12. A letter pitch detection system for detecting the pitch Ps of a character of an aligned group of character images containing several characters touching each other comprising:

means for extracting a plurality of separable letter blocks from said aligned group of characters and for detecting size and location information for each of said letter blocks;

means for storing said size and location information;

means, responsive to said stored information, for setting a permissible range for one-letter block widths;

means for determining a most frequently occurring letter block width within said permissible range;

means, responsive to said most frequently occurring letter block width and said information, for determining an interval effective for estimating said letter pitch;

a letter block width extraction means, responsive to said effective interval and said size and location information, for detecting a group of one-letter blocks, a number of letters in said group, widths of said letter blocks and space widths between adjacent letter blocks of said group; and a letter pitch estimation means responsive to said letter block width extraction means for calculating said letter pitch based upon sums of different numbers of connected letter blocks and a number of said sums.

13. A machine method for detecting the pitch of a series of aligned character images on a surface comprising:

scanning said aligned character images;

successively extracting letter blocks from said series of aligned character images;

storing size and location information for each of said letter blocks;

determining, based on said size and location information, a first interval containing most frequently occurring letter block widths;

determining an effective interval for detecting and extracting a one-letter block based upon said first interval;

detecting a sum of letter block widths within said effective interval of a number of connected one-letter blocks; and estimating a letter pitch based on said sum and said number of connected letter blocks.

14. A machine method for determining the pitch Ps of a character of an aligned groups of character images containing several characters touching each other comprising:

extracting a plurality of separable letter blocks from said aligned group of characters;

detecting size and locating information for each of said letter blocks;

storing said size and location of information;

setting, based upon said stored information, a permissible range for one-letter block widths;

determining a most frequently occurring letter block width within said permissible range;

determining, based upon said most frequently occurring letter block width and said information, an interval effective for estimating said letter pitch Ps;

detecting, based upon said effective interval and said size and location information, a group of one-letter blocks, a number of letters in said group, widths of said letter blocks and space widths between adjacent letter blocks of said group; and determining said letter pitch based upon sums of different numbers of connected letter blocks and a number of said sums.

* * * * *